United States Patent
Smith

(10) Patent No.: US 9,352,823 B2
(45) Date of Patent: May 31, 2016

(54) PROPELLER BLADE WITH REINFORCED SPAR CORE

(75) Inventor: Stephen L. Smith, West Suffield, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 803 days.

(21) Appl. No.: 13/438,877

(22) Filed: Apr. 4, 2012

(65) Prior Publication Data

US 2013/0266452 A1    Oct. 10, 2013

(51) Int. Cl.
*B64C 11/26*    (2006.01)

(52) U.S. Cl.
CPC ............. *B64C 11/26* (2013.01); *Y10T 29/4998* (2015.01); *Y10T 29/49826* (2015.01)

(58) Field of Classification Search
CPC ............. F01D 5/12; F01D 5/14; F01D 5/147; F01D 5/282; F01D 5/284; B64C 11/16; B64C 11/20; B64C 11/22; B64C 11/24; B64C 11/26

USPC ...... 416/223 R, 226, 229 R, 233, 239, 210 R; 29/889.7, 889.71
See application file for complete search history.

(56) References Cited

U.S. PATENT DOCUMENTS

| | | | |
|---|---|---|---|
| 3,519,228 A * | 7/1970 | Windecker | 244/123.5 |
| 4,302,155 A * | 11/1981 | Grimes et al. | 416/144 |
| 4,806,077 A * | 2/1989 | Bost | 416/226 |
| 5,346,367 A * | 9/1994 | Doolin et al. | 416/230 |
| 5,791,879 A * | 8/1998 | Fitzgerald et al. | 416/229 A |
| 7,147,895 B2 * | 12/2006 | Cundiff et al. | 427/289 |
| 8,333,565 B2 * | 12/2012 | McMillan | 416/230 |
| 2011/0299995 A1 * | 12/2011 | Kootstra | 416/232 |
| 2012/0037760 A1 * | 2/2012 | Koppelman et al. | 244/209 |

* cited by examiner

*Primary Examiner* — Nathaniel Wiehe
*Assistant Examiner* — Jason Davis
(74) *Attorney, Agent, or Firm* — Cantor Colburn LLP

(57) ABSTRACT

A propeller blade spar core includes a leading edge spar foam section surrounded by a first structural layer, a trailing edge spar foam surrounded by a second structural layer, and a third structural layer surrounding both the first and second structural layers.

10 Claims, 3 Drawing Sheets

PROPELLER BLADE WITH REINFORCED SPAR CORE

BACKGROUND OF THE INVENTION

The present invention relates to propellers and, in particular, to propeller blades formed having a reinforced spar core.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a carbon composite fabric that is braided on to the foam spar core. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade spar core is disclosed. In this embodiment, the propeller blade spar core includes a leading edge spar foam section surrounded by a first structural layer, a trailing edge spar foam surrounded by a second structural layer, and a third structural layer surrounding both the first and second structural layers.

According to another embodiment, a method of forming a propeller blade spar core is disclosed. The method of this embodiment includes: forming a leading edge spar foam; surrounding the leading edge spar foam with a first structural layer; forming a trailing edge spar foam; surrounding the trailing edge spar foam with a second structural layer; and surrounding both the first and second structural layers with a third structural layer to form a reinforced core section.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
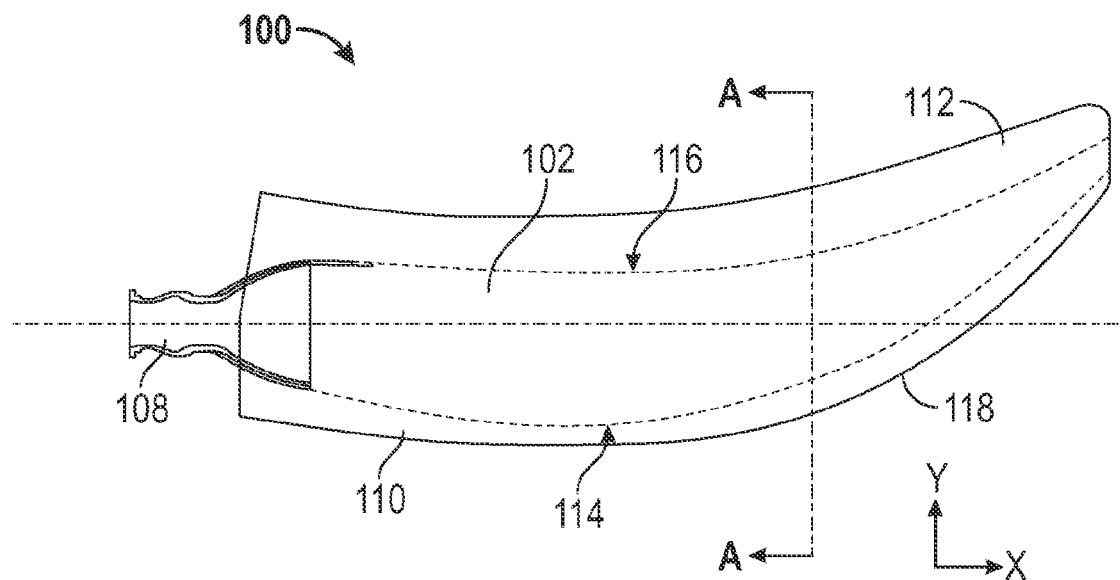
FIG. 1 is a plan-view of a prior art propeller blade.
Figure 2:
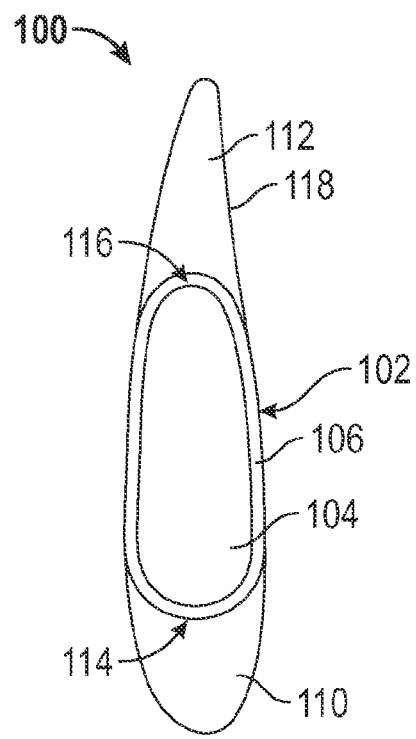
FIG. 2 is a cross-section of the propeller blade shown in FIG. 1.

Referring now to FIG. 1, a plan view of a conventional propeller blade 100 is illustrated and will be used to define certain terms, explain how a propeller blade is generally made, and to illustrate the differences between embodiments of the present invention and the prior art. Reference will also be made to FIG. 2, which is a cross-section of the propeller blade 100 of FIG. 1 taken along line A-A, for these purposes. For convention, and as shown in the legend in FIGS. 1 and 3, direction X shall be referred to as the span wise direction and direction Y shall be referred to as the chord wise direction.

The blade 100 is formed by first forming a spar 102. The spar 102 includes a spar foam core 104 surrounded by a structural layer 106. The core 104 is typically formed of a foam material that is injected into a mold. The mold can include a layer of fiberglass on the walls thereof that to which the foam of the core 104 adheres. As such, the core 104 can be surrounded by a layer of fiberglass prepreg (not shown). The foam that forms the core 104 is typically selected from one of: polyurethane (PU), polyisocyanurate, or polymethacrylimide (PMI).

The structural layer 106 is typically formed of a dry fabric material (e.g. braided carbon, which latter gets injected with resin) and disposed such that it surrounds the core 104 (and the fiberglass layer if it is included). The structural layer 106 is typically braided onto the core 104 and has a uniform thickness for a given cross section along the blade. After resin injection, the spar 102 is heated further to set the resin in the structural layer 106. Considerable thermal stresses can occur in the core 104 as the spar 102 is cooled due to the differences in the coefficients of thermal expansion (CTE) of the core 104 and the structural layer 106.

In some instances, the spar 102 is formed such that a portion of it is surrounded by a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 110 and trailing edge foam 112 are formed on the leading and trailing edges 114, 116, respectively of the spar 102. The leading edge foam 110, trailing edge foam 112 and the spar 102 can then be encased in an outer layer 118. The outer layer 118 can be formed of Kevlar and be in the form of a sock that is pulled over the assembly that includes the leading edge foam 110, trailing edge foam 112 and the spar 102. Of course, the outer layer 118 could be formed in other manners as well.

As described above, considerable thermal stresses can occur in the core 104 as the spar 102 is cooled due to the differences in the coefficients of thermal expansion (CTE) of the core 104 and the structural layer 106. In addition, thermal stresses can be created between the core 104 and the structural layer 106 due to the wide range of temperatures experienced by the propeller blade 100 in normal operation.

Figure 3:
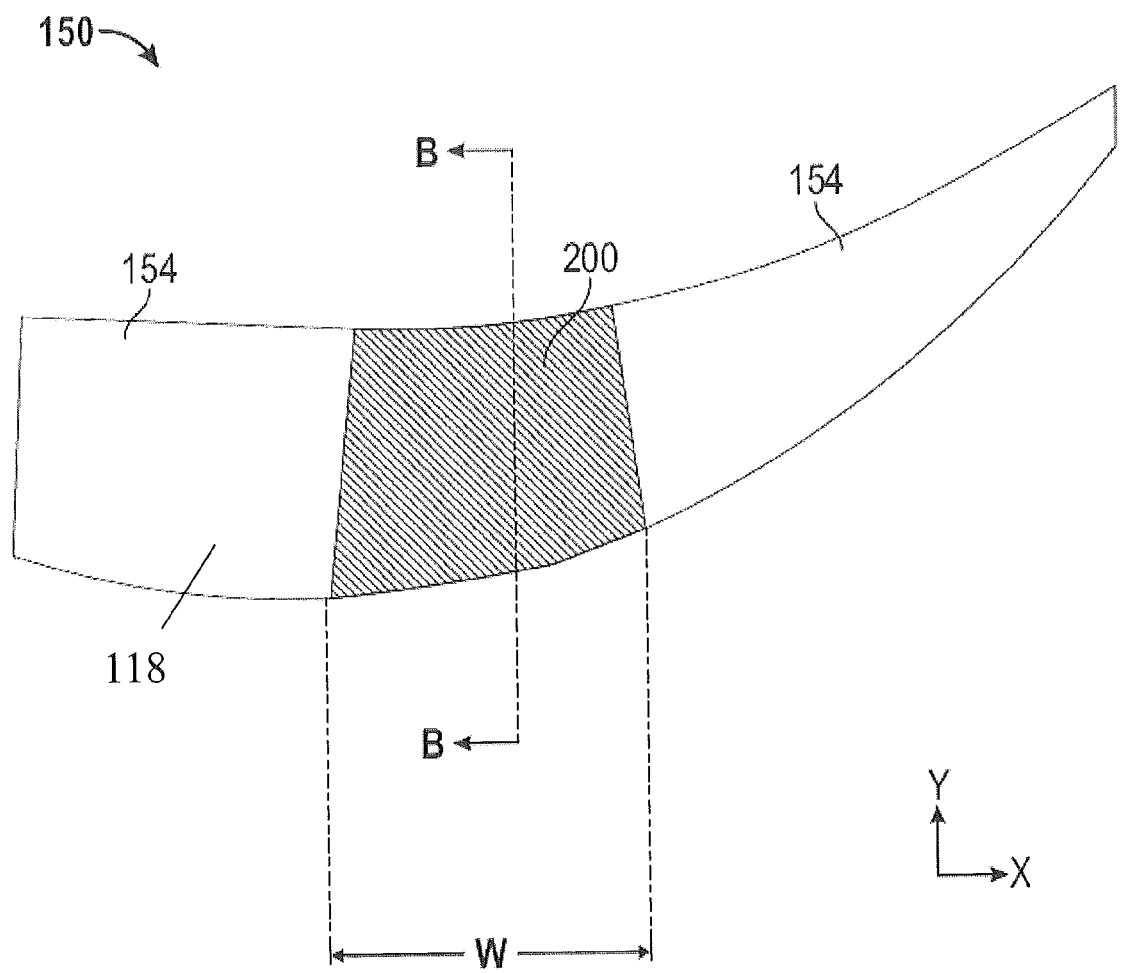
FIG. 3 is plan-view of a propeller blade spar core according to an embodiment of the present invention.

FIG. 3 shows a plan view of a spar core 150 according to one embodiment. In this embodiment, the spar core 150 includes a reinforced section 200 and two conventional sections 154 disposed on either side of the reinforced section 152.

The conventional sections could be formed in the manner as described above. In particular, a conventional foam spar core as described above and cutting a portion sized to receive the reinforced section 200. The conventional sections 154 and the reinforced section 200 could then be bonded together, for example, with an adhesive material or using overlapping layers of fiberglass prepreg. Of course, the one or both of the conventional sections 154 could be omitted and the omitted portion(s) formed as a reinforced section 200. For instance, if both conventional sections 154 were omitted, the entire spar core 150 could be formed as a reinforced section 200. It shall be understood that the entire spar core 150 (regardless of configuration) can be covered by a structural layer 118 that is braided on in the manner as is known in the prior art.

Figure 4:
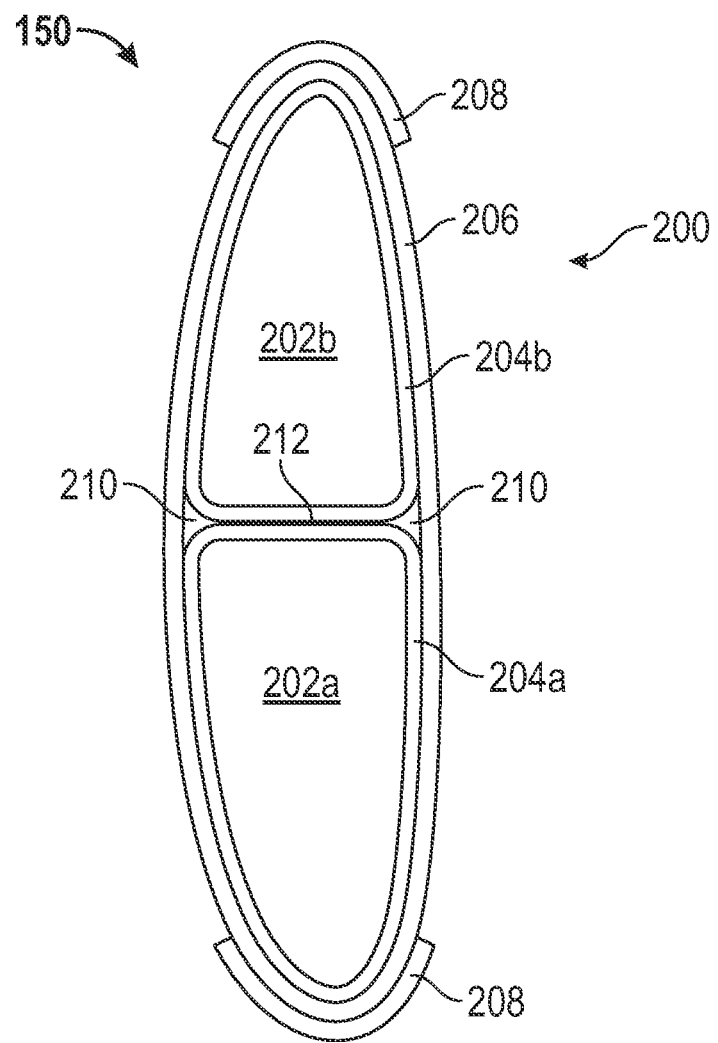
FIG. 4 is cross-section of the propeller blade spar core shown in FIG. 3.

FIG. 4 is cross-section of the spar core 150 taken along line B-B through the reinforced section 200 shown in FIG. 3. The reinforced section 200 includes leading and trailing edge spar foam sections 202a, 202b. These foam sections 202a, 202b can be formed of any type of suitable foam including those mentioned above as well as honeycomb. The foam sections can be formed in separate molds or can be formed by cutting a large foam section into two small portions.

Regardless of how formed, each of the foam sections 202a, 202b is surrounded by a one or more braided or cloth layers to form, respectively, internal structural layers 204a, 204b. The internal structural layers 204a, 204b can be formed, for example, of braided carbon or cloth plies including carbon fibers. In one embodiment, the carbon reinforcement 204 is formed of braided carbon layers (biased, for example, at 45 degrees) for shear resistance and carbon cloth layers having a 0/90 degree bias to provide for axial and bending resistance.

In one embodiment, optionally, one or more layers of a resin impregnated material (referred to as "pre-preg" in the industry and shown generally as a joining layer 212) are disposed between adjacent ends of the foam sections 202a, 202b after the structural layers 204a, 204b have been applied. In one embodiment, the prepreg includes a low flow resin to tack the sections 202a, 202b. In another embodiment, the joining layer 212 is formed of a carbon cloth. The carbon cloth may, in one embodiment, include a resin to allow for tacking and that is compatible with the injection resin (e.g., HP03), to allow better resin flow and wetting during the resin transfer molding operation. The joining layer 212 can extend in the span wise direction along the length of the blade along some or all of width w (FIG. 3) of the reinforced section 200. In one embodiment, foam sections 202a, 202b, structural layers 204a, 204b and the joining layer can all be placed into a foam mold die to cure the joining layer 212.

The entire assembly can then be wrapped in one or more plies of a carbon cloth 206 In one embodiment, the carbon cloth 206 is tackified to allow to hold components of the assembly in a fixed relationship to one another. Optionally, any spaces formed between the joining layer 212 and the carbon cloth 206 could be filled by inserts 210. The particular size and shape of the inserts 210 will be determined by the particulars of the foam sections 202 and the inserts 210 are placed before the carbon cloth 206 is applied. In one embodiment, the carbon cloth 206 is formed of one or more braided carbon sleeves (biased, for example, at 45 degrees) for shear resistance and one or more carbon cloth layers having a 0/90 degree bias to provide for axial and bending resistance.

In one embodiment, edge layers 208 formed of a resin impregnated material (e.g., low flow resin pre-preg) can be placed on one or both of the leading and trailing edges of the reinforced section 200. The reinforced section 200 as shown in FIG. 4 can be joined with other sections in one embodiment to form a spar core 150 as generally shown and described in FIG. 3. Regardless of the exact configuration, the reinforced section 200 (and any sections coupled to it) is then covered with spar braided layers to form the 106 spar before being resin transfer molded with the shell, to form a propeller blade as described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade spar core comprising:
   a leading edge spar foam section completely surrounded by a first structural layer;
   a trailing edge spar foam completely surrounded by a second structural layer that is separate from the first structural layer; and
   a third structural layer surrounding both the first and second structural layers, wherein the first and second structural layers directly contact each other.

2. The propeller blade spar core of claim 1, further comprising:
   at least one insert disposed between the first or second structural layer and the third structural layer.

3. The propeller blade spar core of claim 1, wherein at least one of the first, second and third structural layers are formed of a braided carbon material.

4. The propeller blade spar core of claim 3, wherein all of the first, second and third structural layers are formed of a braided carbon material.

5. The propeller blade spar core of claim 1, further comprising:
   an edge layer disposed on one or both a leading edge or a trailing edge of the third structural layer.

6. The propeller blade spar core of claim 5, further comprising:
   a root disposed within an outer structural layer that surrounds the third structural layer and at an end of the propeller blade.

7. A method of forming a propeller blade spar core comprising:
   forming a leading edge spar foam;
   surrounding the leading edge spar foam with a first structural layer;
   forming a trailing edge spar foam;
   surrounding the trailing edge spar foam with a second structural layer that is separate from the leading first structural layer;
   contacting the first and second structural layers together; and
   surrounding both the first and second structural layers with a third structural layer to form a reinforced core section.

8. The method of claim 7, further comprising:
   injecting a resin into the first, second and third layers; and curing the resin.

9. The method of claim 7, further comprising:
   operably connecting the reinforced section to one or more foam spar cores.

10. The method of claim 9, wherein the further comprising:
   forming an outer structural layer surrounding both the reinforced section and the foam spar cores.

* * * * *